(12) United States Patent
Bonny

(10) Patent No.: US 8,109,747 B1
(45) Date of Patent: Feb. 7, 2012

(54) DRIVE SYSTEM HAVING A VARIABLE OUTPUT GEROTOR PUMP

(75) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 565 days.

(21) Appl. No.: 12/336,183

(22) Filed: Dec. 16, 2008

Related U.S. Application Data

(60) Provisional application No. 61/014,273, filed on Dec. 17, 2007, provisional application No. 61/019,491, filed on Jan. 7, 2008.

(51) Int. Cl.
*F03C 2/00* (2006.01)
*F03C 4/00* (2006.01)
*F04C 18/00* (2006.01)

(52) U.S. Cl. ............ 418/171; 418/3; 418/5; 418/9; 417/205; 60/487

(58) Field of Classification Search .......... 418/3, 5, 418/9, 61.3, 166, 171; 417/199.1, 205; 60/487–490
See application file for complete search history.

(56) References Cited

U.S. PATENT DOCUMENTS

| | | | |
|---|---|---|---|
| 2,266,191 A | 12/1941 | Granberg | |
| 2,649,739 A | 8/1953 | Hufferd et al. | |
| 2,898,862 A * | 8/1959 | Brundage | 418/171 |
| 2,988,007 A * | 6/1961 | Quintilian | 418/27 |
| 3,007,418 A | 11/1961 | Brundage | |
| 3,106,897 A | 10/1963 | Johnson | |
| 3,177,665 A * | 4/1965 | Power | 60/464 |
| 3,198,127 A | 8/1965 | Brundage | |
| 3,362,161 A | 1/1968 | Flint | |
| 4,413,960 A | 11/1983 | Specht | |
| 4,674,287 A | 6/1987 | Ishimori et al. | |
| 5,546,752 A | 8/1996 | Horton et al. | |
| 6,122,996 A | 9/2000 | Hauser et al. | |
| 6,126,420 A | 10/2000 | Eisenmann | |
| 6,571,554 B2 | 6/2003 | Johnson | |
| 6,691,512 B1 | 2/2004 | Kopel et al. | |
| 7,028,708 B1 | 4/2006 | Langenfeld et al. | |
| 2004/0175277 A1 * | 9/2004 | Cox et al. | 417/239 |
| 2007/0193264 A1 * | 8/2007 | Dong et al. | 60/487 |

* cited by examiner

*Primary Examiner* — Theresa Trieu
(74) *Attorney, Agent, or Firm* — Neal, Gerber & Eisenberg LLP

(57) ABSTRACT

A variable output assembly including a hydraulic pump disposed on a pump running surface located on a center section, end cap or other hydraulic mounting member. The pump may be a gerotor or other rotatable pump body. A support member is disposed between the pump running surface and the pump and includes a pump support surface having openings to permit fluid communication between the support member and the pump running surface. A motor assembly may be hydraulically connected to the pump running surface by a first porting system, and a sump is hydraulically connected to the pump running surface by a second porting system. The support member is movable between neutral and a plurality of positions corresponding to forward and reverse directions of the output. In forward and reverse positions, the support member permits fluid communication between the pump and the motor through the support surface openings and the first porting system, and in the neutral position the support member permits fluid communication between the pump and the sump through the support surface openings and the second porting system.

24 Claims, 9 Drawing Sheets

US 8,109,747 B1

DRIVE SYSTEM HAVING A VARIABLE OUTPUT GEROTOR PUMP

CROSS-REFERENCE

This application claims priority from Provisional U.S. App. Ser. No. 61/014,273 filed on Dec. 17, 2007 and from Provisional U.S. App. Ser. No. 61/019,491 filed Jan. 7, 2008, the terms of which are incorporated herein by reference.

BACKGROUND OF THE INVENTION

This invention relates to hydraulic drive systems which may be used, for example in vehicles and, in particular, vehicles having continuously variable drive systems. Such hydraulic drive systems come in an array of configurations. One example of such a system is shown in commonly owned U.S. Pat. No. 6,122,996. These systems provide an array of benefits, but even with the array of configurations currently available there is a need for even greater compactness and reduced cost.

SUMMARY OF THE INVENTION

A vehicle drive system incorporating a variable output gerotor pump and a fixed gerotor motor is disclosed herein. An adjustable gerotor support member is rotatable to a variety of positions to alter the output of the gerotor pump and, at a specified position, provide a neutral displacement. The details of the invention are set forth below in connection with the detailed description of the embodiments.

A better understanding of the invention will be obtained from the following detailed description and accompanying drawings, which set forth illustrative embodiments that are indicative of the various ways in which the principals of the invention may be employed.

DETAILED DESCRIPTION OF THE DRAWINGS

Figure 1:
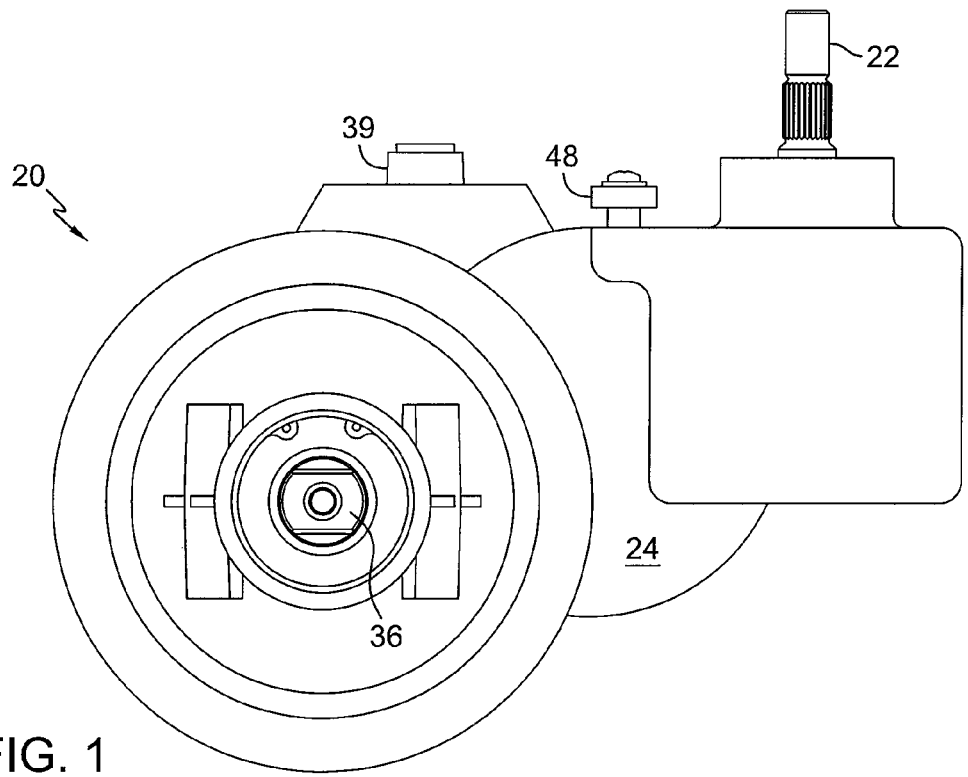
FIG. 1 is a side elevational view of a drive system incorporating a first embodiment of the present invention.
Figure 3:
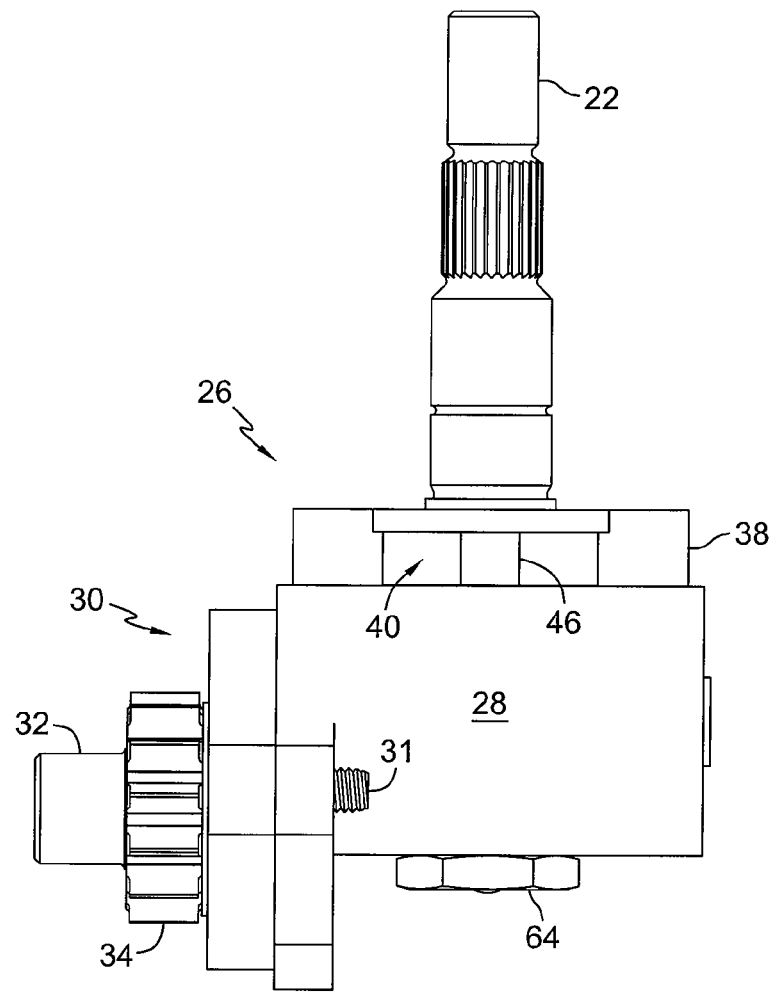
FIG. 3 is a side elevational view of a drive system including a hydraulic mounting member with a variable output gerotor pump and a gerotor motor mounted on it, in accordance with the first embodiment of this invention.
Figure 15:
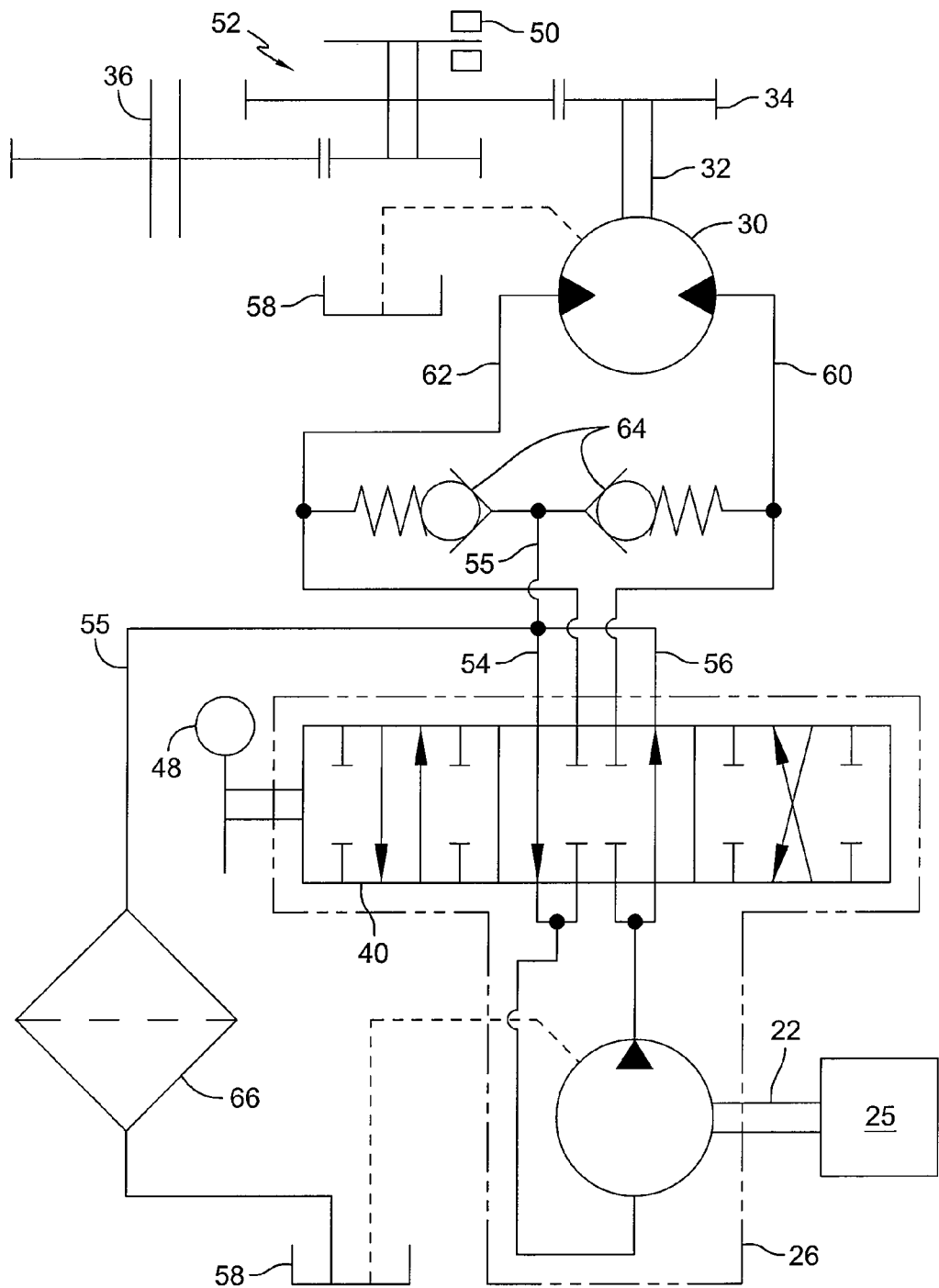
FIG. 15 is a exemplary hydraulic schematic of a drive system in accordance with one embodiment of the present invention.

Turning now to the figures, where like reference numerals refer to like elements, there is illustrated in FIGS. 1, 3 and 15 a first embodiment of drive system 20. Drive system 20 comprises an input shaft 22 which receives motive force from a prime mover 25 and which may be supported within a housing 24. Input shaft 22 is drivingly coupled to a variable output gerotor pump assembly 26 supported on a hydraulic mounting member 28. As will be described in more detail, hydraulic mounting member 28 comprises porting that fluidly connects gerotor pump assembly 26 with a gerotor motor assembly 30, which may be attached to hydraulic mounting member 28 by fasteners 31. It will be understood that the embodiments depicted are for use in a vehicle drive system, but that the invention has applicability in other drive systems as well.

Gerotor motor assembly 30, comprising inner gerotor element 30b and outer gerotor element 30a, is drivingly coupled to an output shaft 32 that may also be called a motor shaft. Output shaft 32 may have a gear 34 or other driving configuration positioned thereon that may drive an axle 36. As shown in the schematic of FIG. 15, gear 34 may also drive a gear train 52 that may include a differential (not shown) to then drive one or more axle shafts 36. Though not shown, it will also be understood by one of skill in the art that output shaft 32 may itself be an axle shaft.

It should also be apparent to a person of ordinary skill in the art that while the terminology "gerotor" is used throughout this description, there are equivalent mechanisms and terminologies known in the art, such as gerollers, trochoidal pumps, and other equivalent devices. Therefore, the terminology "gerotor" is a term representative of a type of pump that accomplishes movement of fluid in the manner described herein and is not to be read as limited to the specific hardware disclosed in the figures.

Drive system 20 may comprise additional elements such as a vent 39 or a connection for an expansion tank, which may be separately mounted or directly mounted to drive system 20. Other additional elements that may be included are a brake 50, as shown in FIG. 15, a power take-off (not shown), or a hydraulic bypass (not shown).

The operation of drive system 20 will now be explained, with references FIGS. 3, 4, 5 and 15. As input shaft 22 is rotated by a prime mover 25, such as a vehicle engine or an electric motor (not shown), inner gerotor element 44 and outer gerotor element 42 will rotate. Rotation of inner gerotor element 44 and outer gerotor element 42 causes hydraulic fluid to be displaced from gerotor assembly 26 through hydraulic porting formed in hydraulic mounting member 28. This hydraulic porting comprises first and second system passages 60 and 62, which act to connect pump assembly 26 and motor assembly 30, as well as alternative passages 54 and 56, as shown in the schematic of FIG. 15 and described in more detail herein. It will be and such passages can be formed in various manners, including, e.g., casting or drilling. In the embodiment depicted in, e.g., FIG. 11, hydraulic mounting member 28 has a first generally planar side on which pump assembly 26 is disposed, a second generally planar side on which motor assembly 30 is disposed and a third generally planar side formed opposite the first side.

Figure 7:
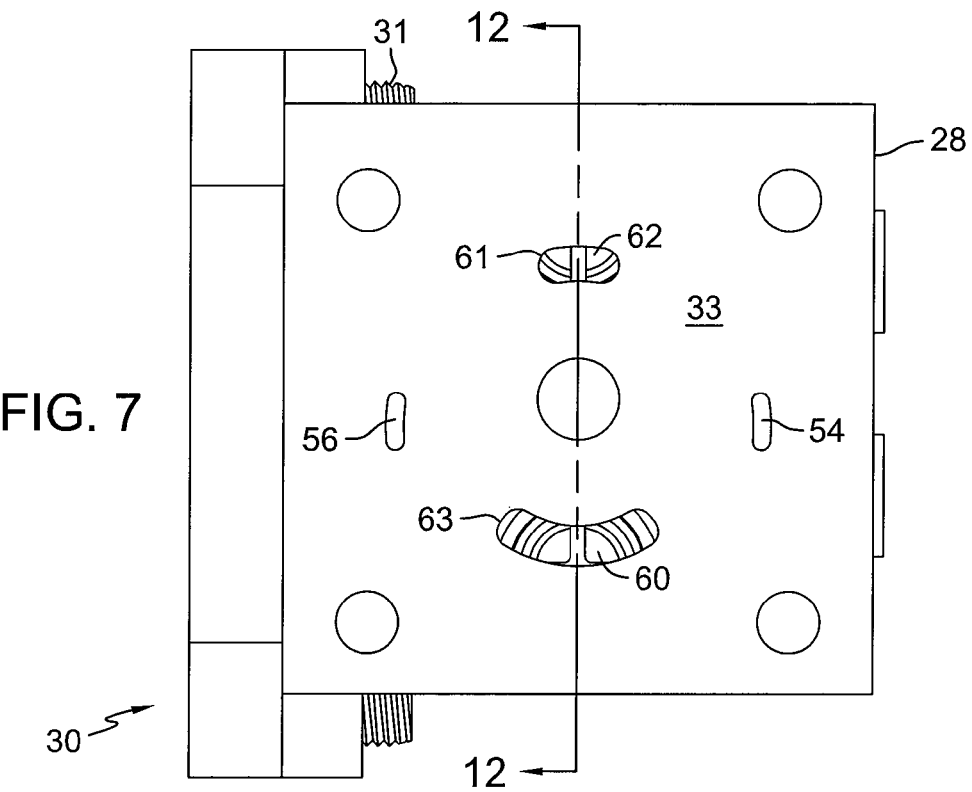
FIG. 7 is a top plan view similar to FIG. 6, with the variable output gerotor of the drive system completely removed.
Figure 13:
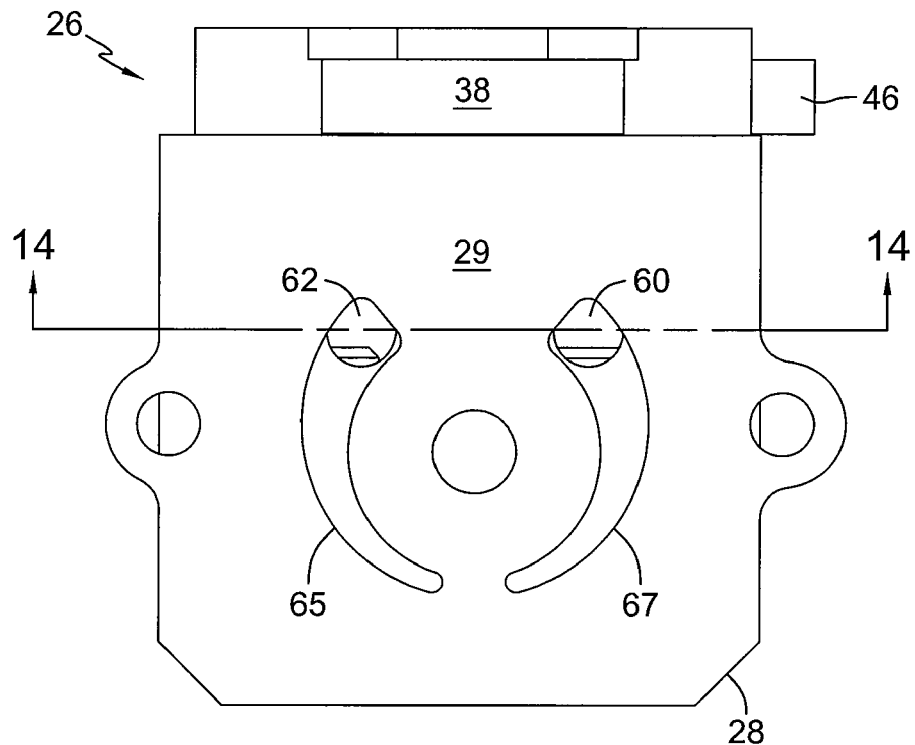
FIG. 13 is a side elevational view of the hydraulic mounting member, showing the motor mounting face.
Figure 14:
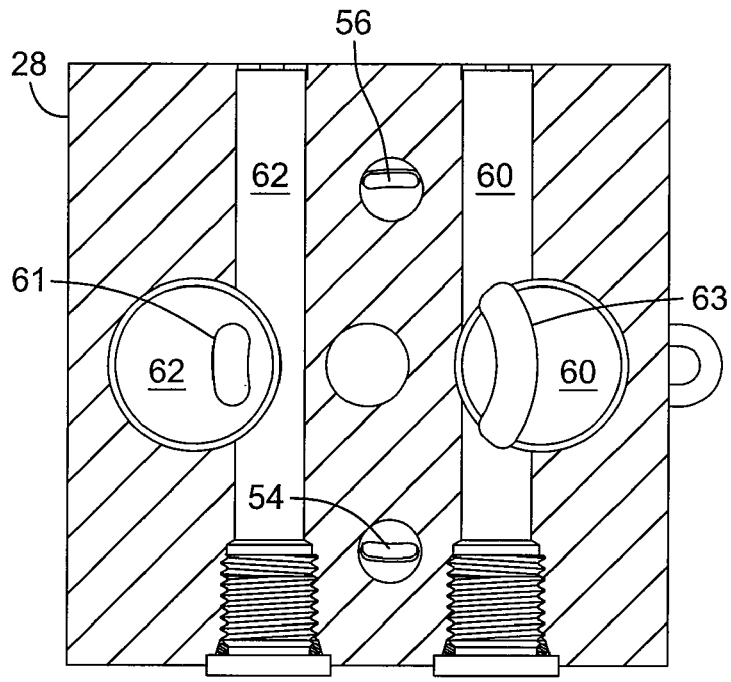
FIG. 14 is a sectional view of the hydraulic mounting member along lines 14-14 in FIG. 13.

As shown in FIGS. 7, 13 and 14, the hydraulic porting further comprises kidney ports 61 and 63 formed on pump mounting face 33 of member 28, and kidney ports 65 and 67 formed on motor mounting face 29. Kidney ports 61 and 65 both communicate with passage 62 while kidney ports 63 and 67 both communicate with passage 60, thereby permitting communication between pump assembly 26 and motor assembly 30 through a closed loop system during operation, which may be referred to as a first porting system. As discussed in more detail below, cup base wall 43 includes kidney-shaped openings 68, 70 which cooperate with kidney ports 61 and 63.

Figure 5:
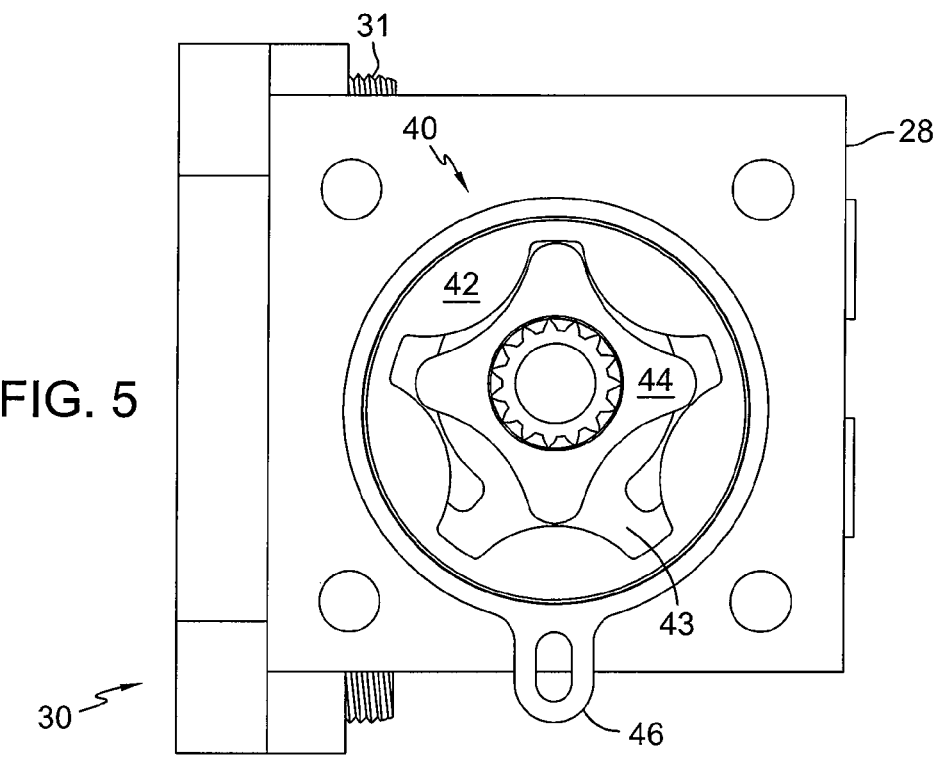
FIG. 5 is a top plan view of the hydraulic mounting member and components of the gerotor pump assembly of FIG. 4, with a cover of the variable output gerotor pump housing removed.

Referring to FIG. 5, it will be noted that outer gerotor element 42 and inner gerotor element 44 are positioned such that the optimal area for fluid input and for fluid output to and from these elements is offset from the center of rotation of inner gerotor element 44. Kidney-shaped openings 68, 70 in cup base wall 43 are configured to match the optimal area of fluid input and fluid output from outer gerotor element 42 and inner gerotor element 44 and thus attain the appearance shown in FIG. 8. Kidney port 61 and kidney port 63 are formed of different lengths corresponding to the smaller gap between kidney-shaped openings 68, 70 at one end of kidney-shaped openings 68, 70 and the larger gap between kidney-shaped openings 68,70 at the other end of the kidney-shaped openings 68,70. Variable output gerotor pump assembly 26 comprises a cover 38, through which input shaft 22 may extend. Cover 38 may be fastened to hydraulic mounting member 28 by way of fasteners 41. Rotatably mounted within cover 38 and positioned adjacent to hydraulic mounting member 28 is a gerotor support member or pump support 40. For purposes of this disclosure, the gerotor support member or pump support 40 will be referred to as cup 40.

Outer gerotor element 42 and inner gerotor element 44 are housed within cup 40, as shown in FIG. 5. Inner gerotor element 44 is mated to input shaft 22 so that rotation of input shaft 22 will cause inner gerotor element 44 to rotate, thus also moving outer gerotor element 42.

Cup 40 includes a base wall 43 disposed on the pump running surface 33 of hydraulic mounting member 28 and a side wall 45 extending upwards from base wall 43 to form a cylinder. Base wall 43 includes two opposing, kidney-shaped openings 68 and 70 to permit fluid communication between cup 40 and the hydraulic porting formed in mounting member 28 as described herein. The use of cup 40 assists in supporting side loads from the movement of outer gerotor element 42 and inner gerotor element 44; cover 38 could be modified so as to handle such stresses, so the cup shape and the interface of that shape with cover 38 is not critical to this invention.

Figure 2:
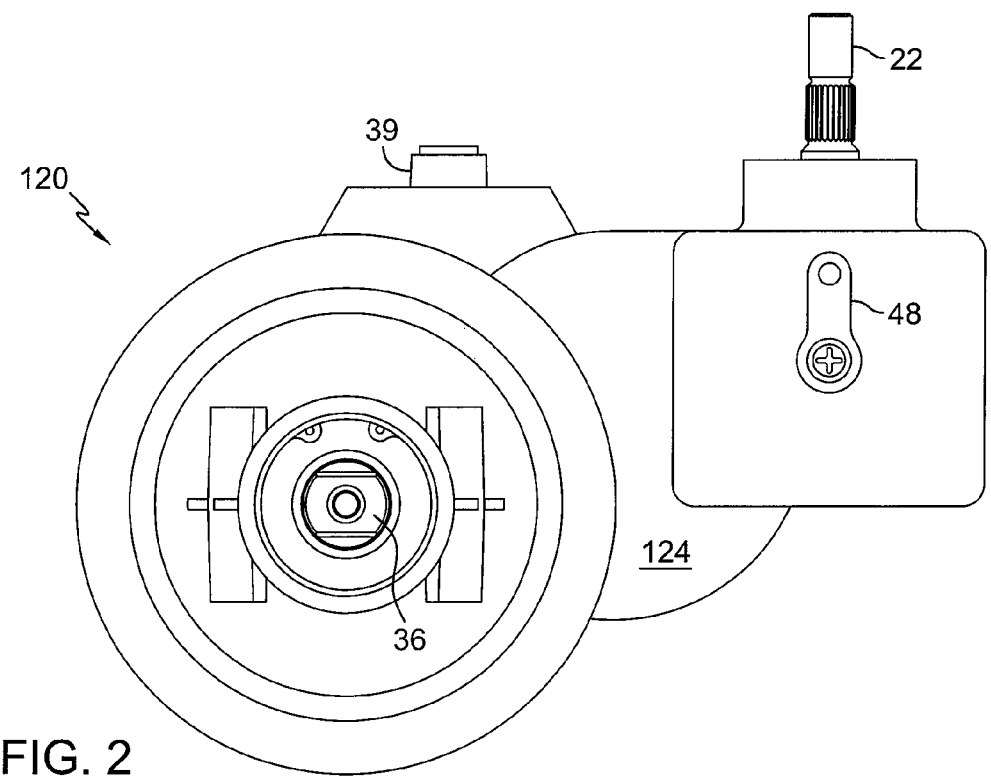
FIG. 2 is a side elevational view of a drive system incorporating a second embodiment of the present invention.

Cup 40 further includes a protrusion 46 extending outwardly from its periphery and which is attached to a separate control 48, and the portion of cup 40 on pump mining surface 33 is adjusted by movement of protrusion 46, which is attached either directly to control 48 or by way of a linkage (not shown). Control 48 may be located in various places on drive system 20. For example, in the first embodiment depicted in FIG. 1, control 48 is disposed on the side of housing 24 adjacent input shaft 22, while in a second embodiment, as shown in FIG. 2, control 48 may be located on a side of housing 124 of drive system 120 perpendicular to input shaft 22. In both cases, control 48 is connected to protrusion 46 through a linkage (not shown). As will be described below, movement of cup 40 changes the location of openings 68 and 70 with respect to different components of the porting formed in hydraulic mounting member 28, in order to change the flow of hydraulic fluid from gerotor assembly 26.

Figure 4:
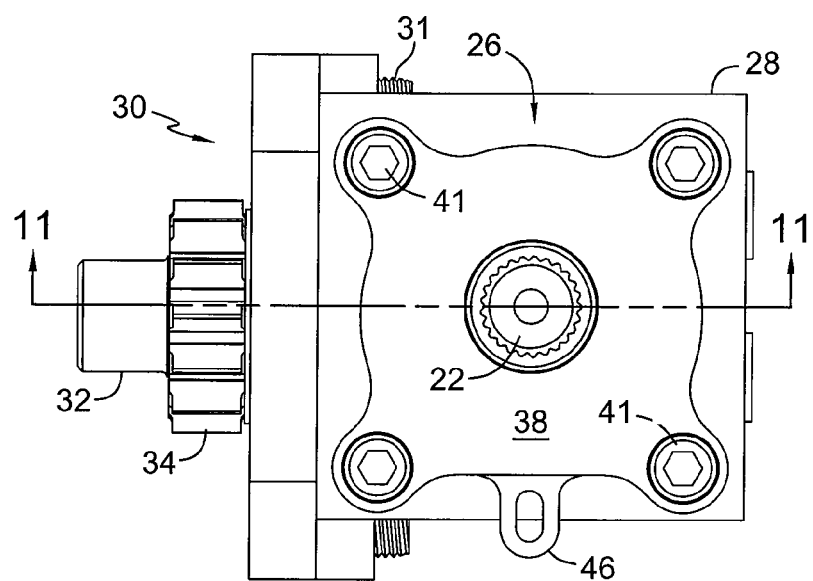
FIG. 4 is a top plan view of the drive system of FIG. 3.
Figure 8:
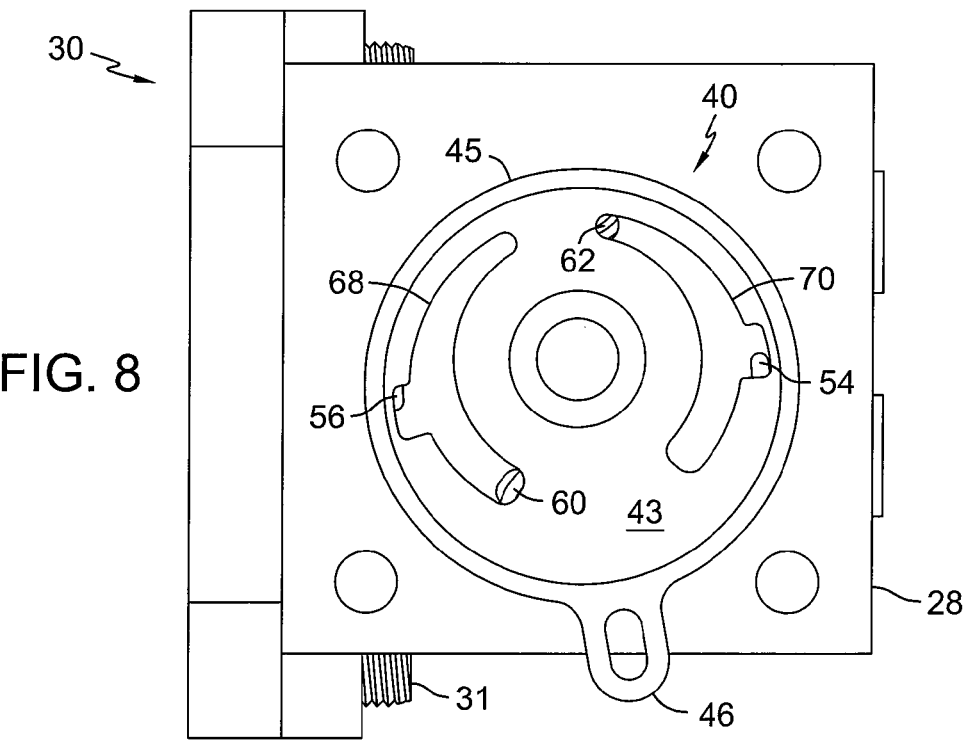
FIG. 8 is a top plan view similar to FIG. 6, showing the gerotor cup rotated in a first direction.
Figure 9:
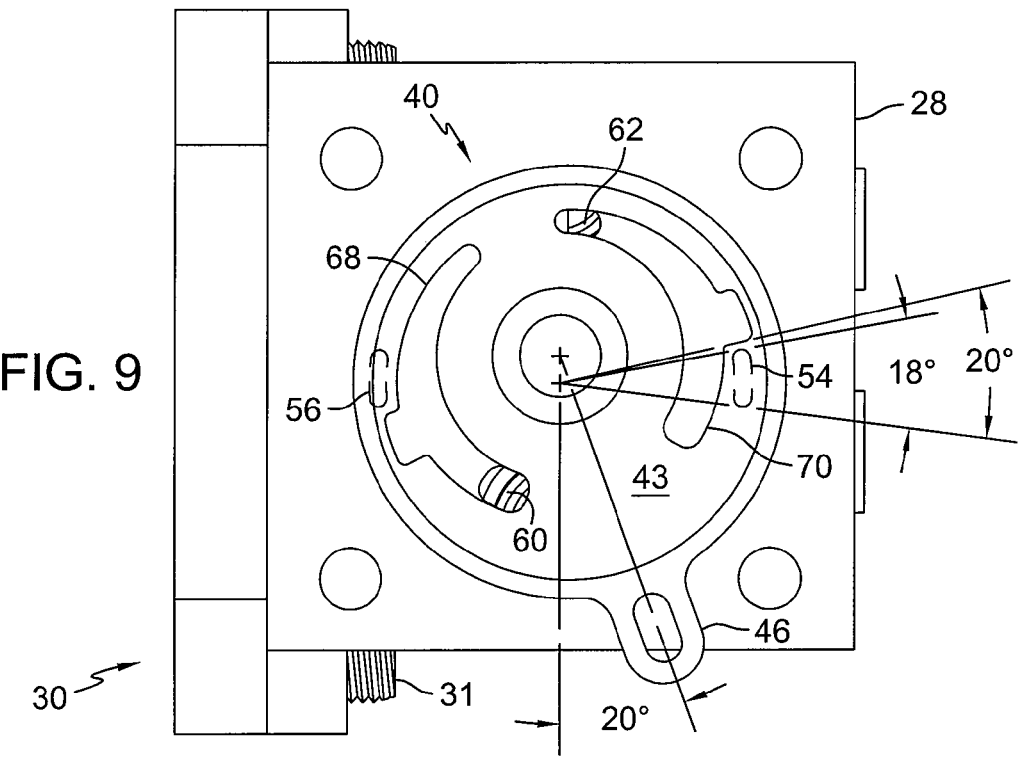
FIG. 9 is a top plan view similar to FIG. 8, showing the gerotor cup rotated further in the first direction.
Figure 10:
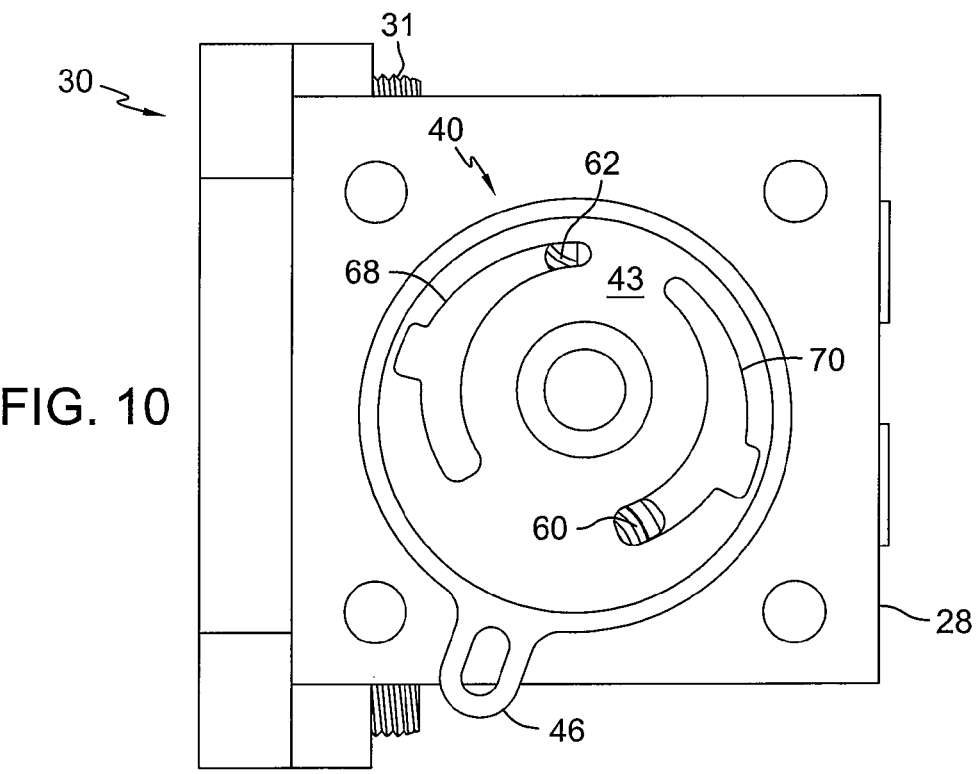
FIG. 10 is a top plan view similar to FIG. 6, showing the gerotor cup rotated in a second direction.

Cup 40 is movable between a variety of positions, several of which are depicted in the figures, and movement of cup 40 affects the flow of hydraulic fluid from pump assembly 26, thereby acting like a proportional valve. The location of cup 40 as shown in FIGS. 4 and 5 correspond to a neutral position of pump assembly 26, as will be described below. FIGS. 8 and 9 depict cup 40 moved in a first direction, while FIG. 10 shows cup 40 moved in a second direction, opposite to the first direction. As will be understood, one of these directions will correspond to a "forward" direction of drive system 20 while the other will correspond to a "reverse" direction, and drive system 20 is infinitely variable between its full forward and full reverse positions based on the position of cup 40 as it is moved through its full range of motion.

It will be understood that the required range of motion of cup 40 in this design can be quite small, depending on the arc length subtended by passages 54 and 56. In the present embodiment, passages 54 and 56 subtend approximately 18 degrees, so cup 40 is movable to approximately 20 degrees to completely block passages 54 and 56. As will be seen; the size of passages 54 and 56 needs to be adequate to accommodate the full fluid flow of pump assembly 26, so a smaller displacement pump may result in a smaller arc length for passages 54 and 56. Conversely, a larger displacement pump or other need for larger passages 54 and 56 may require a longer arc length for passages 54 and 56, and thus cup 40 may require more rotation to block passages 54 and 56. The maximum angle of rotation of cup 40 may also affect the arc length of kidney port 61 and kidney port 63, requiring these kidney ports to be longer or shorter in arc length to assure the full displacement of pump assembly 26 is available to first system passage 60 and second system passage 62.

Figure 6:
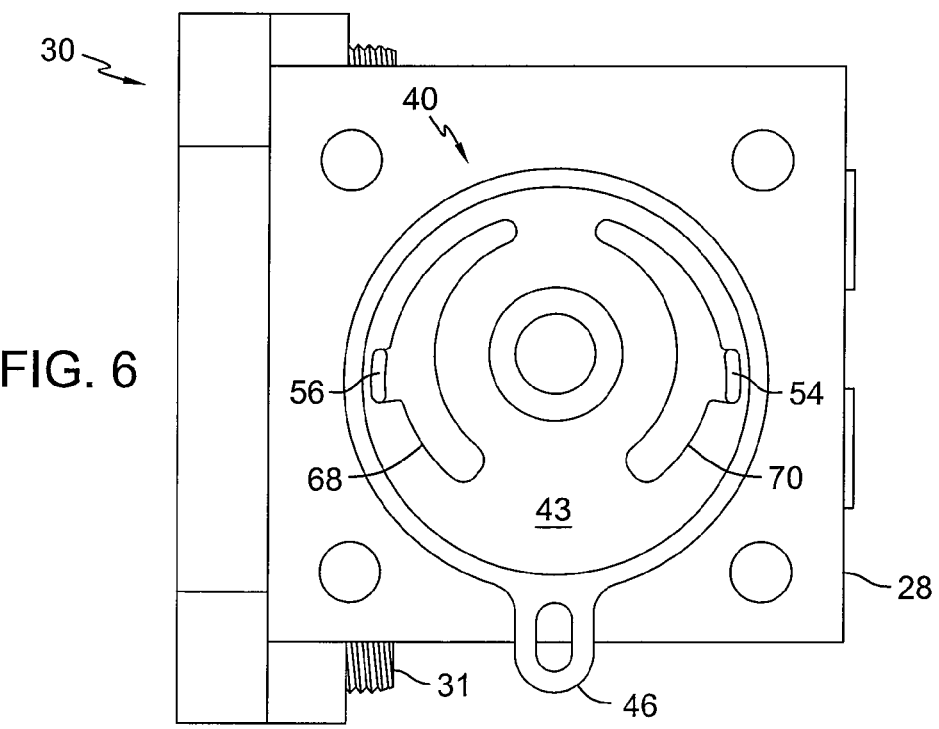
FIG. 6 is a top plan view similar to FIG. 5, with the inner and outer gerotor elements of the drive system removed.
Figure 11:
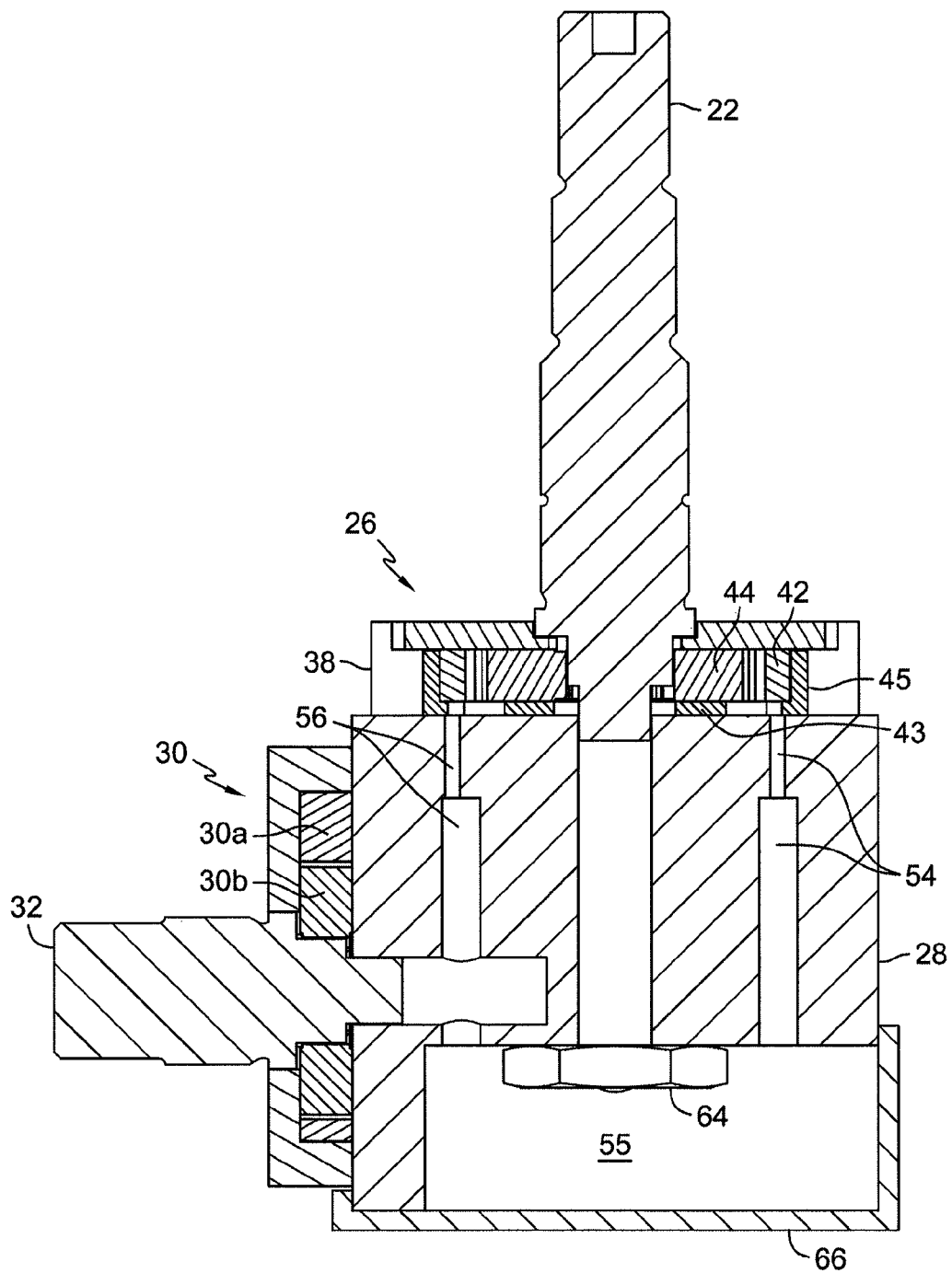
FIG. 11 is a sectional view of the drive system along the lines 11-11 in FIG. 4.

If cup 40 is positioned as shown in FIGS. 4 and 5, pump assembly 26 will be in a neutral position. However, outer gerotor element 42 and inner gerotor element 44 will continue to displace hydraulic fluid, so an alternate path for the displaced hydraulic fluid must be provided in order to prevent the displaced hydraulic fluid from causing motor assembly 30 to rotate. This alternative path, which may be referred to as a second porting system, comprises passages 54 and 56 formed in hydraulic mounting member 28, both of which are connected to an external surface of hydraulic mounting member 28. In the embodiment shown, these passages terminate in a filter sump 55, which may optionally be formed by use of filter 66 and main sump 58. When cup 40 is in this "neutral" position, hydraulic fluid pumped from pump assembly 26 will flow through opening 68 formed in cup 40 into passage 56 and then into filter sump 55 as shown in FIGS. 6, 11 and 15. Pump assembly 26 will simultaneously pull hydraulic fluid from filter sump 55 through passage 54 and then through opening 70 formed in cup 40. Thus, when pump assembly 26 is in neutral, hydraulic fluid will be circulated by pump assembly 26 from and to filter sump 55, and no fluid will flow to motor assembly 30.

As cup 40 is rotated from the neutral position, alternative flow passages 54 and 56 are slowly closed, while first system passage 60 and second system passage 62 are slowly opened. If inner gerotor 44 is rotated clockwise when viewed as shown in FIG. 5 and if cup 40 is rotated counterclockwise, as shown in FIG. 8, then pump assembly 26 will supply pressurized fluid through first system passage 60 and passage 56 while pulling fluid from second system passage 62 and passage 54. The amount of fluid going into passage 56 will decrease as cup 40 is rotated counterclockwise until cup 40 reaches the fully rotated position, as shown in FIG. 9. Thus, cup 40 and its interaction with the various porting elements formed in hydraulic mounting member 28 forms a proportional valve.

Because cup 40 interfaces with hydraulic mounting member 28 along a plane, the amount of fluid pumped into passage 56 and the amount of fluid pulled from passage 54 will be negligible when cup 40 is in the position shown in FIG. 9. Also, the flow of fluid into first system passage 60 and the fluid pulled from second system passage 62 will be the maximum possible.

Moving cup 40 clockwise will cause similar conditions to occur in passage 54, passage 56, first system passage 60 and second system passage 62, only the passages previously pressurized will become suction passages and the passages previously under suction will become pressurized passages. Thus, when cup 40 is in the position shown in FIG. 10, fluid flow from gerotor assembly 26 will be into second system passage 62 and fluid will be pulled into gerotor assembly 26 from first system passage 60.

Figure 12:
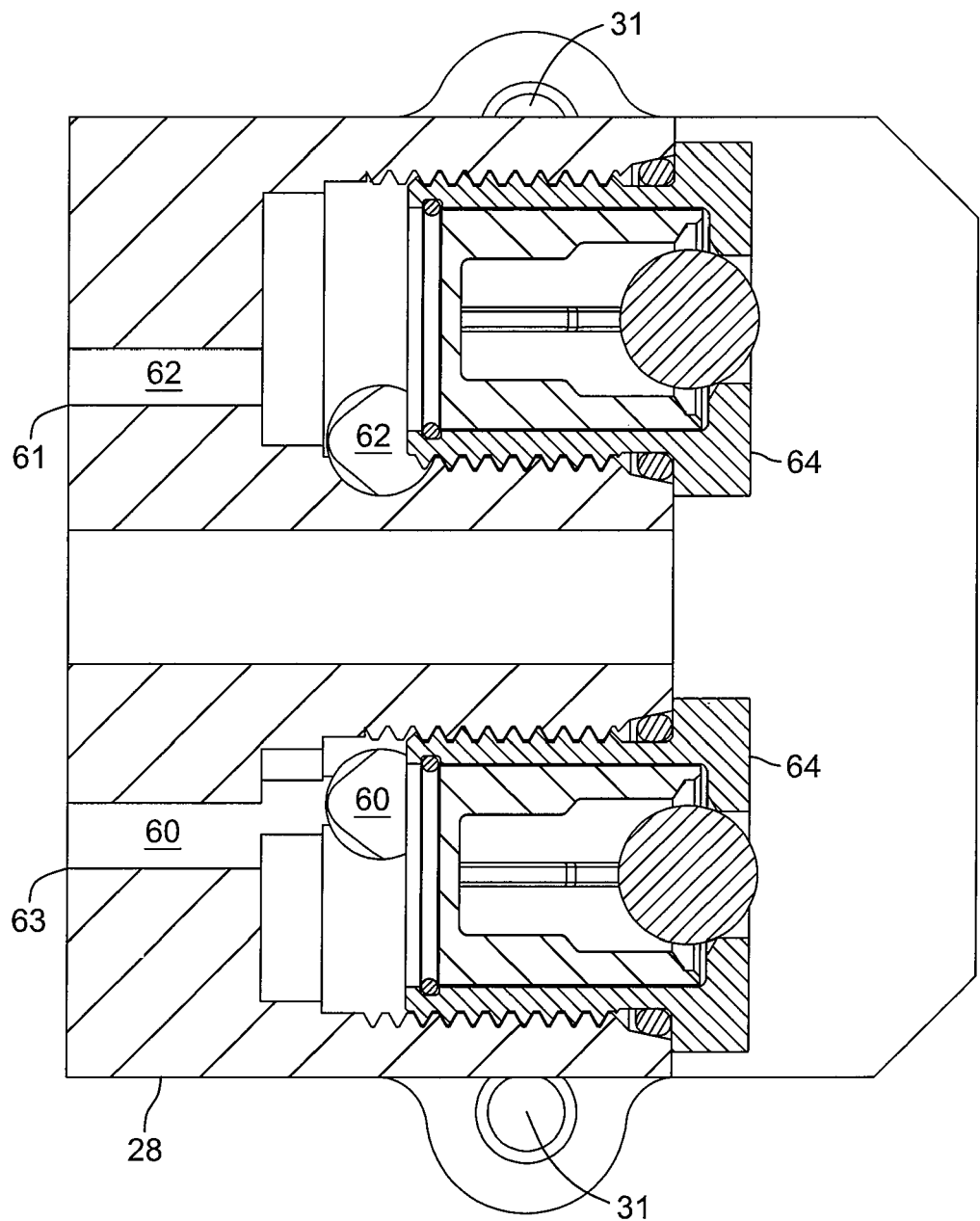
FIG. 12 is a sectional view of the hydraulic mounting member of the drive system along lines 12-12 in FIG. 7.

Leakage may occur from various places in this system. As shown, e.g., in FIGS. 12 and 15, first and second check valves 64 may be provided to replace leaked fluid in the system. Check valves 64 may permit fluid to enter either first system passage 60 or second system passage 62 from filter sump 55 when either first system passage 60 or second system passage 62 attains vacuum pressure, meaning a pressure below atmospheric pressure.

Other elements are adaptable to this configuration. Various valves may be adapted to interface with this invention, such as one of the valves shown in U.S. Pat. No. 4,674,287 or a combination valve similar to that shown in commonly owned U.S. Pat. No. 5,546,752, 6,691,512, or 7,028,708. The teachings of these patents are incorporated herein by reference.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A variable output gerotor assembly comprising:
   a hydraulic mounting member having hydraulic porting formed therein, the hydraulic porting comprising a first pair of hydraulic passages extending from a first surface of the hydraulic mounting member to a second surface of the hydraulic mounting member, and a second pair of hydraulic passages extending from the first surface to a volume external to the hydraulic mounting member;
   a hydraulic pump assembly disposed on the first surface and comprising a gerotor pump rotatably positioned on a gerotor support member, the gerotor support member having a plurality of openings formed therein;
   a hydraulic motor assembly disposed on the second surface of the hydraulic mounting member;
   wherein the gerotor support member is movable between a plurality of positions with respect to the hydraulic mounting member, the plurality of positions comprising at least one first position where the gerotor support member permits fluid communication between the gerotor pump and the hydraulic motor assembly through at least one of the plurality of openings and the first pair of hydraulic passages, and at least one second position where the gerotor support member permits fluid communication between the gerotor pump and the external volume through at least one of the plurality of openings and the second pair of hydraulic passages.

2. The variable output gerotor assembly of claim 1, wherein the first surface is perpendicular to the second surface.

3. The variable output gerotor assembly of claim 1, comprising a first check valve connecting one of the first pair of hydraulic passages with the volume external to the hydraulic mounting member and a second check valve connecting the other of the first pair of hydraulic passages with the volume external to the hydraulic mounting member.

4. The variable output gerotor assembly of claim 1, wherein the gerotor support member comprises a cup having a generally flat surface on which the gerotor pump is disposed and a side surface forming a cylinder.

5. The variable output gerotor assembly of claim 4, further comprising a cover that cooperates with the cup to enclose the gerotor pump, wherein the cover is secured to the hydraulic mounting member and the cup is retained between the cover and the hydraulic mounting member.

6. The variable output gerotor assembly of claim 4, wherein the gerotor support member further comprises a protrusion engaged to the side surface, a control mechanism linked to the protrusion.

7. The variable output gerotor assembly of claim 4, wherein the plurality of positions comprises a first set of positions where the gerotor support member permits fluid communication between the gerotor pump and the hydraulic motor through the openings and the first pair of hydraulic passages and blocks all fluid communication between the gerotor pump and the external volume, and a second set of positions where the gerotor support member permits fluid communication between the gerotor and the external volume through the openings and the second pair of hydraulic passages and blocks all fluid communication between the gerotor pump and the hydraulic motor.

8. The variable output gerotor assembly of claim 7, wherein the plurality of positions further comprises a third set of positions where the gerotor support member permits fluid communication between the first and second pairs of hydraulic passages.

9. A variable drive device comprising:
   a hydraulic pump assembly;
   a hydraulic motor assembly hydraulically connected to the hydraulic pump assembly through a first pair of hydraulic passages connecting the hydraulic pump assembly to the hydraulic motor assembly;
   a second pair of hydraulic passages connecting the hydraulic pump assembly to a sump; and
   a proportional valve located between the hydraulic pump assembly and the first and second pairs of hydraulic passages, the proportional valve comprising a movable portion on which the hydraulic pump assembly rotates and a plurality of openings formed in the movable portion to interface with at least two of the passages in the first and second pairs of hydraulic passages.

10. The variable drive device of claim 9, wherein the hydraulic pump assembly comprises a first gerotor.

11. The variable drive device of claim 10, wherein the hydraulic motor assembly comprises a second gerotor.

12. The variable drive device of claim 9, further comprising:
   a hydraulic mounting member, wherein the hydraulic pump assembly and the hydraulic motor assembly are disposed thereon and the first and second pairs of hydraulic passages are formed therein;

a first check valve to connect one of the first pair of hydraulic passages to the sump and a second check valve to connect the other of the first pair of hydraulic passages to the sump.

13. The variable drive device of claim 12, comprising a filter positioned adjacent to the hydraulic mounting member to separate the sump into a first sump formed between the filter and the hydraulic mounting member and a second sump.

14. The variable drive device of claim 13, wherein the second pair of hydraulic passages open into the first sump, and wherein the first check valve and the second check valve are located so that when they open they pull fluid from the first sump.

15. A hydraulic device comprising:
a hydraulic mounting member comprising a generally planar first side;
a first pair of hydraulic passages formed in and extending through the hydraulic mounting member, wherein each of the first pair of hydraulic passages terminates at a separate opening on the first side of the hydraulic mounting member;
a second pair of hydraulic passages formed in and extending through the hydraulic mounting member, wherein each of the second pair of hydraulic passages terminates at a separate opening on the first side of the hydraulic mounting member;
a pump support having a generally planar surface and two openings extending therethrough, the pump support being rotatably mounted on the first side of the hydraulic mounting member so that the pump support openings interact with the separate openings of each of the first and second pairs of hydraulic passages;
a hydraulic pump disposed on the pump support in a manner that permits the hydraulic pump to rotate independent of the pump support; and
a hydraulic motor in fluid communication with the first pairs of hydraulic passages;
wherein rotation of the pump support causes the openings formed therein to interact with the openings of the first and second pairs of hydraulic passages to control the amount of fluid supplied by the hydraulic pump to the hydraulic motor from no flow to a maximum flow defined by the capacity of the hydraulic pump and the efficiency of the hydraulic device.

16. The hydraulic device of claim 15, wherein the hydraulic mounting member further comprises a generally planar second side that is generally perpendicular to the first side, and the hydraulic motor is disposed on the second side.

17. The hydraulic device of claim 15, further comprising a first check valve disposed between one of the first pair of hydraulic passages and a sump external to the hydraulic mounting member and a second check valve disposed between the other of the first pair of hydraulic passages and the external sump.

18. The hydraulic device of claim 15, wherein the hydraulic mounting member further comprises a third side that is generally opposite to the first side, and the second pair of hydraulic passages extends from the first side to the third side.

19. The hydraulic device of claim 15, wherein the pump support is generally shaped as a cup and the hydraulic pump comprises a gerotor rotatably positioned within the cup, and further comprising a cover to secure the cup to the hydraulic mounting member and permit the cup to be rotatably movable by a control mechanism.

20. A hydraulic device comprising:
a hydraulic pump assembly disposed on a pump running surface and comprising a rotatable pump body and a support member disposed between the pump running surface and the pump body, the support member comprising a pump surface and a plurality of openings formed in and extending through the pump surface to permit fluid communication between the support member and the pump running surface;
a hydraulic motor assembly hydraulically connected to the pump running surface by a first porting system;
a sump hydraulically connected to the pump running surface by a second porting system;
wherein the support member is movable between a plurality of positions, the plurality of positions including at least one first position where the support member permits fluid communication between the pump assembly and the motor assembly through at least one of the plurality of openings and the first porting system and at least one second position where the support member permits fluid communication between the pump assembly and the sump through at least one of the plurality of openings and the second porting system.

21. The hydraulic device of claim 20, further comprising a hydraulic mounting member, where the pump running surface is formed thereon, and the first and second porting systems are integrally formed therein.

22. The hydraulic device of claim 20, wherein the rotatable pump body comprises a gerotor and the support member comprises a cup and a cover secured to the cup to encapsulate the gerotor.

23. The hydraulic device of claim 20, wherein the plurality of positions of the support member comprises a first set of positions where the support member blocks all fluid communication between the pump assembly and the second porting system, and a second set of positions where the support member blocks all fluid communication between the pump assembly and the first porting system.

24. The hydraulic device of claim 23, wherein the plurality of positions further comprises a third set of positions where the support member permits fluid communication between both the pump assembly and the first porting system and between the pump assembly and the second porting system.

* * * * *